United States Patent [19]

Gehrmann

[11] Patent Number: 4,461,705

[45] Date of Patent: Jul. 24, 1984

[54] ENDLESS CHAIN DRIVEN RACK AND PINION DISPLACEMENT DEVICE FOR FILTER PRESSES

[75] Inventor: Gerd-Peter Gehrmann, Gerlafingen, Switzerland

[73] Assignee: Von Roll AG, Gerlafingen, Switzerland

[21] Appl. No.: 434,380

[22] Filed: Oct. 14, 1982

[30] Foreign Application Priority Data

Oct. 22, 1981 [CH] Switzerland .................... 6757/81

[51] Int. Cl.³ .............................................. B01D 25/12
[52] U.S. Cl. ................................... 210/225; 210/230; 210/236; 100/198
[58] Field of Search .......................... 210/225–230, 210/236; 100/198

[56] References Cited

U.S. PATENT DOCUMENTS

| | | | |
|---|---|---|---|
| 3,306,455 | 2/1967 | Fismer | 210/230 |
| 4,226,721 | 10/1980 | Baas | 210/225 |
| 4,325,396 | 4/1982 | Gehrmann | 134/181 |

FOREIGN PATENT DOCUMENTS

| | | | |
|---|---|---|---|
| 46212 | 8/1888 | Fed. Rep. of Germany | 210/230 |
| 1295517 | 5/1969 | Fed. Rep. of Germany | 210/230 |
| 1441316 | 6/1976 | United Kingdom | 210/230 |

*Primary Examiner*—David R. Sadowski
*Attorney, Agent, or Firm*—Murray Schaffer

[57] ABSTRACT

Apparatus for separating and displacing the plates of a filter press, one by one, is provided with a rail mounted above and extending along the length of the press on which a trolley is supported. The trolley is movable reciprocably along the rail by an endless envelope change drive, entrained with a sprocket wheel fixed on a shaft, journalled in the trolley. A separating device is supported in the trolley for movement reciprocably perpendicular to the direction of movement of the trolley toward and away from the filter plates. The separating device is connected to the sprocket shaft so that rotation of the shaft lifts or lowers a separating wedge relative to the filter plates separating the first of the filter plates and enabling the trolley to displace it alone.

6 Claims, 6 Drawing Figures

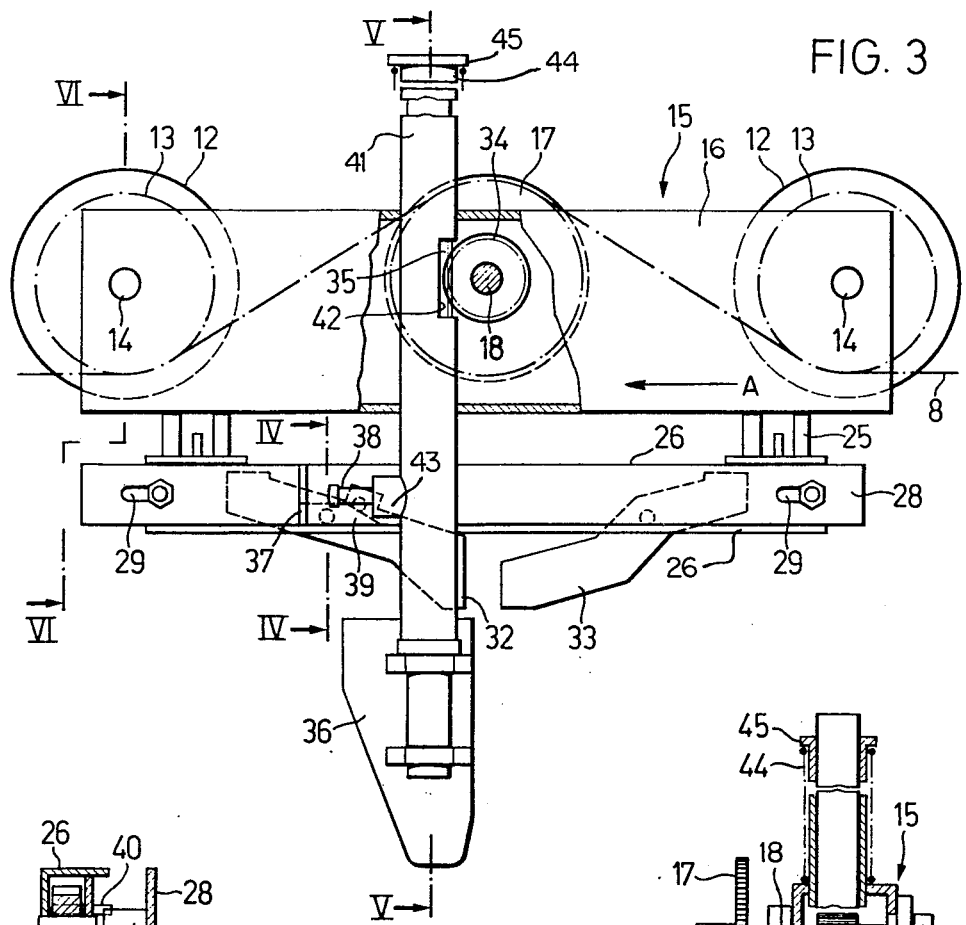
FIG. 3
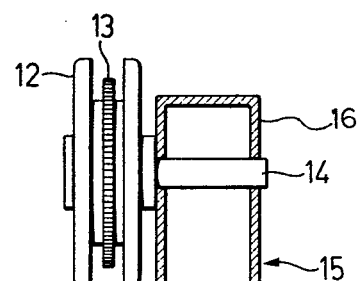
FIG. 4
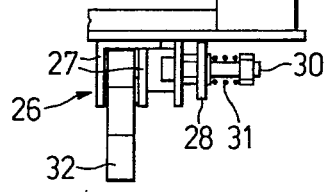
FIG. 6
FIG. 5

4,461,705

ENDLESS CHAIN DRIVEN RACK AND PINION DISPLACEMENT DEVICE FOR FILTER PRESSES

BACKGROUND OF THE INVENTION

The present invention relates to a filter press and in particular to a displacement apparatus for separating and removing individual filter plates for cleaning, etc.

Various displacement devices have been known for use on filter presses, which individually displace each filter plate so that the periodic removal of the filter cake from the plate can be made, following the opening of the filter press. Envelope drives, particularly continuous chain drives, equipped with a separating mechanism, have been used for the displacement of the filter plates. Due, however, to the size and weight of the filter plates, two such envelope drives are generally provided, set either on each of the sides or above the filter plates. The separating mechanism generally comprises a plurality of movable pawls arranged on the chains constituting the envelope drives, which pawls hook in at a point provided on the filter plates and drive the latter. The chain drives continuously move or perform a reciprocating movement. In this connection, it is important that only a single filter plate be driven in each case. However, since the filter plates are pressed firmly against one another, and are coated with a cake which causes the plates to adhere to each other, it is possible that during the separation of one filter plate, by the pawl, one or more of the following filter plates are simultaneously displaced. That is, although it is intended to remove only a single plate at a time, two or more plates are frequently removed. This is prejudicial to the operating process since the cake is very difficult to remove from the adhering multiple plates. To avoid this condition, additional components have been generally used, which are intended to cooperate with the separating mechanism to prevent displacement of more than one filter plate at a time.

One known construction is disclosed in No. GB-A-1441, 316, wherein a pivotal pawl wheel is associated with each filter plate and engages with a rack, so that each filter plate is positively held in place. In order to displace the filter plate, the corresponding pawl wheel must be first released from the rack by pivoting the pawl. This means for locking each of the individual plates, however, represents a costly and complicated solution. It has furthermore been found that disengagement is not always reliable.

In another known construction shown in No. DE-Al-1295517, a continuous envelope drive is arranged on each side of the filter plate. This solution is also complicated and costly and it is not possible to retain or retard the following filter plate on the displacement of the first filter plate.

It is an object of the present invention to construct a filter plate displacement device, wherein there is no need for using special means on the driving mechanism for holding back the following or subsequent filter plates, so that as a result, the displacement device is simplified.

It is a further object, however, to provide a filter plate displacement device which insures positive displacement of the first, and only the first of the filter plates in the press.

The foregoing objects, together with other objects and advantages, are set forth in the following disclosure.

SUMMARY OF THE INVENTION

According to the present invention, the apparatus for separating and displacing the plates of a filter press, one by one, is provided with a rail mounted above and extending along the length of the press on which a trolley is supported. The trolley is movable reciprocably along the rail by an endless envelope chain drive, entrained with a sprocket wheel fixed on a shaft journalled in the trolley. A separating device is supported in the trolley for movement reciprocably perpendicular to the direction of movement of the trolley toward and away from the filter plates. The separating device is connected to the sprocket shaft so that rotation of the shaft lifts or lowers the separating wedge relative to the filter plates separating a first of the filter plates and enabling the trolley to displace it alone.

The connection between the shaft, envelope drive and separating device, cooperates so that sequential tranverse of the trolley to the correct position between the first and second plates, lowering of the separating device to dislodge the first plate and thereafter raising of the separating device and subsequent traversing of the trolley to displace the plate is effected, in an automatic, sequential and continuous manner.

Admittedly, an envelope drive is disclosed U.S. Pat. No. 4,325,396, for moving a trolley to which a washing pipe is pivotably connected so that the filter plates may be washed. However, the construction shown there is such that it can not be employed for separation of the filter plates or their displacement since the trolley moves transverse to the axis of the press, and, therefore, is not relevant to the present invention.

Full and further details of the present invention are set forth in the following disclosure and are illustrated in the accompanying drawing.

BRIEF DESCRIPTION OF THE DRAWINGS

In the Drawings:

FIG. 3 is an enlarged view of the trolley employed in the displacement device shown in FIG. 1, FIG. 4 is a cross-sectional view taken along line IV—IV, FIG. 5 is a sectional view taken along line V—V of FIG. 3, and FIG. 6 is a sectional view taken along line VI—VI of FIG. 3.

DESCRIPTION OF THE INVENTION

Figure 1:
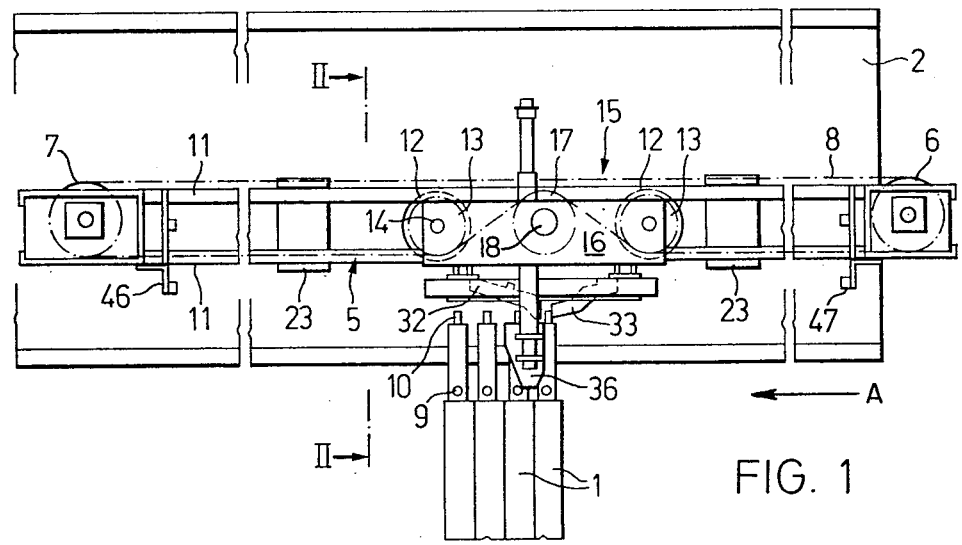
FIG. 1 is a side view of the displacement device of the present invention.
Figure 2:
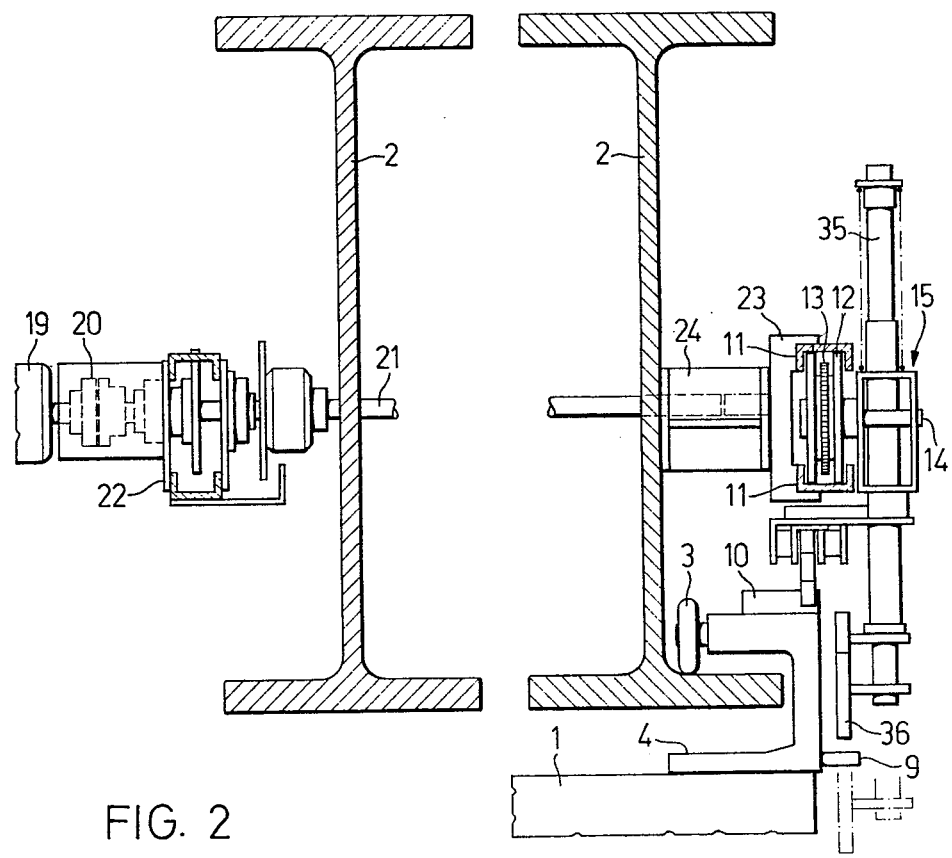
FIG. 2 is a large scale cross-sectional view taken along line II—II of FIG. 1.

The displacement device of the present invention is employed in connection with an otherwise conventional filter press, of which only the filter plates 1 are illustrated in the drawings. As seen in FIGS. 1 and 2, a double T or I beam 2 is mounted in suitable manner on the supporting frame of the filter press to extend along its length. Each filter plate 1 is suspended from the exterior lower flanges of the beams 2 by a roller 3 journalled on a hook shaped bracket 4 secured at each of the upper corner edges of the filter plate. It will be observed that each filter plate 1 is provided with two hooks 4 and their associated rollers 3 and the displacement means is provided symmetrically on each side of the beams 2. Thus, while the drawings illustrate only one side (the right, as seen in FIG. 2) the other side is to be envisioned as containing the same elements and structure.

Arranged alongside of each of the beams 2 is a supporting rail 11 on which is suspended the respective filter plate displacement apparatus. Each of the displacement apparatus comprises an envelope drive 5 having a driving gear 6 journalled at the forward end of rail 11 and a guide pulley 7 journalled at the rear end of the rail, and a continuous chain 8. The rail 11 is, in fact, formed of a pair of mutually opposed U-shaped rails, the forward end of which extends beyond the beams 2 so that the drive gears 6 of each envelope drive, which are driven from a common drive, as explained later, are not interfered with by the beam.

Each of the brackets 4 on each of the filter plates 1 are provided with a pin 9 extending laterally outwardly and a web 10 extending upwardly. A trolley generally depicted by the numeral 15 is mounted so that it extends from each rail 11 and is movable parallel to the horizontal axis of the beams 2 by the envelope drive 5. Each trolley 15 comprises two pair of wheels 12 between each of which is sandwiched a freely rotatable cog wheel 13. The paired wheels 12 are fixed on a shaft 14 while the cog wheel 13 is freely rotatable about the respective shaft. Between the two pair of wheels 12 is a transport wheel 17 mounted on a shatt 18. The shafts 14 and 18 extend outwardly from the rail 11 and are journalled in a rectangular horizontally disposed housing 16. The chain 8 of the envelope drive 5 is entrained so that its lower run engages the lower sector of the cogwheels 13 while simultaneously engaging the upper sector of the transport cogwheel 17 as seen in the dot-dash lines of FIGS. 1 and 2. As will be explained in more detail hereinafter, the trolley 15 is traversable from the front to the rear of the rail 11 and reversibly so, when the central transport cogwheel 17 is held stationary.

As seen in FIG. 2, an electric motor 19 is mounted on the left side of the press (far side of the FIG. 1). The electric motor 19 is preferably a reversible one having a built-in automatic reversing feature, dependant on a drop in speed of the motor, due to drag or load conditions in the motor. Such motors are now common. On the other hand suitable control circuitry, responsive to the drop in speed or load can be attached to the motor to affect the same automatic reversibility. The electric motor 19 drives via a coupling 20 and a shaft 21, each of the driving gears 6 of the respective envelope drives 5. The motor 19 coupling 20 and shaft 21 are mounted on the rails 11 by means of a bracket 22. The rails 11, as seen in FIG. 2 are themselves secured to the beams 2 by a suitable number of connecting fixtures 23 and brackets 24. The shaft 21 extends from the drive wheel 6 on the left side via a suitable coupling, clear across the span between the beams 2, to be suitably coupled to the axle of the drive shaft 6 on the right side of the beams as shown in FIG. 2. In this manner, the envelope drive 5 and trolleys 15 are driven in unison.

As seen more clearly in FIGS. 3 & 6, depending from the bottom edge of the trolley 15, are a plurality of brackets 25 to which an elongated channel support 26 is fixed. The channel support 26 has spaced front and rear walls 27. A slide 28 is carried on the front one of the walls 27 and is guided by means of slots 29 on bolts 30. Each of the bolts 30 is provided with a compression spring 31, which thus frictionally holds the slide 28. A pawl 32 and a stopcatch 33 are pivotally mounted between the walls 27 of the support at 26 on axles 32a and 33a respectively. Pawl 32 and catch 33 hang freely downward opposite to each other as seen in FIGS. 3 and 4 and 6.

As seen in FIG. 5, a pinion 34 is fixably mounted on the shaft 17 extending through the housing 16 of the trolley. The pinion 34 cooperates with a rack 35 disposed vertically in the housing 16 so as to be movable in the vertical direction. At its lower end the rack 35 carries a separating wedge 36, see FIG. 3, which is adapted to insert itself between the laterally extending separating pins 9 on the filter plates 1 when the rack 35 is lowered.

As seen further in FIGS. 3 and 4, the slide 28 is provided with a fixed stop 37 adapted to engage a spring biased pin 38 when the slide 28 is moved to the right as seen in FIG. 3. On engaging the stop 37, the pin 38 enters into a detent or hole formed on the rack 35, thereby maintaining the rack 35 stationary. This stationary condition of the rack is transmitted via pinion 34 to the shaft 17 and this results in the holding of the transportation cogwheel 17 itself stationary blocking the rack 35 from vertical movement. The slide 28 is also provided with an inclined cam 39 adapted to engage a pin 40 projecting laterally from the pawl 32 (FIG. 4) causing the pawl to be lifted, on movement of the slide 28 to the right (as seen in FIG. 3).

The rack 35 is guided in a pipe 41 fixed in the housing 16. The pipe 41 is provided with a cutout 42 enabling engagement of the pinion 34 with the rack 35 with a guide opening 43 through which the spring biased pin 38 passes. A flanged cap 45 is fixed on the end of rack 35 and a compression spring 44 surrounds the pipe 41 abutting the upper surface of the housing 16, and the shoulder of the cap 45, thus normally causing the rack 35 to be biased upward as seen in FIG. 2.

In operation, the displacement device functions in the following manner:

The device is structured so that in the initial position of the trolley, it is situated to the far right, as seen in FIGS. 2 and 3, adjacent so-called filter press column (not shown). In this situation, the rack 35 is elevated in the position shown in FIGS. 2 and 3, largely under influence of the spring 44.

On initiating operation, the movable end plate or head, not shown, of the filter press is opened to the right in a more or less conventional manner. The envelope drives 5 are now started by activation of the motor 19, so that the trolleys are moved toward the still compressed filter plates 1. To effect this, the device gears 6 are rotated clockwise, causing the lower rung of chain 8 to move from right to left as shown by arrow A. Because the rack 35 is in the upper position, being held there by spring 44, the transport cogwheel 17 is held stationary. The force of spring 44 is so great as not to permit movement of the transport cogwheel 17 by the relatively free movement of chain 8. Thus, chain 8 and transport cogwheel 17 are relatively locked together at this time resulting in the movement of the trolley from right to left. The free sprockets 13 merely act to guide the chain. The chain drive 8 will thus cause the trolley only to move from right to left. To prevent abuttment of the stopcatch 33 on the head or end plate, which has been displaced from the compressed batch of the press, a connecting link such as an inclined cam, is provided on the head or endplate which cam causes the catch 33 to rise as the trolley passes over the endplate.

On reaching the first of the filter plates 1 in the press, the stopcatch 33, now hangs downwardly to abut against the web 10 of the first plate 1 held in the press, (See FIG. 1) causing the trolley to stop. However, since the chains 8 continue to move, being driven by the drive wheels 6, the heretofore stationary transport wheel 17 is caused to rotate the force of the chains now being greater than that of the spring 44. The cogwheel 17, thus rotates simultaneously rotating pinion 34 which moves the rack 35 and its attached separating wedge 36 downwardly between the separating pins 9 of the first and second plates in the press. In this manner, separating wedge 36 separates the front or foremost filter plate 1 from the remaining compressed filter plates.

When the separating wedge 36 has moved all the way down and completed the separation of the plates 9, the pinion 34 stops rotating, placing a counter drag on the chain 8, which is transmitted to the motor 19, thus causing the motor to automatically reverse itself. On reversal of the motor, the drive gears 6 are rotated counter clockwise, causing the rack 35 to be moved into the upward position by the reverse rotation of the pinion 34 and with the aid of the biasing spring 44. As soon as the rack 35 is moved into the upward extreme position, rotation of the pinion 34 is blocked, and the trolley 15 moved, from left to right. Simultaneously, however, the pawl 32, which normally depends below the level of the web 10, engages the left side of the web 10, so that it pushes the plate 1, from left to right. When the trolleys reach their initial position, the rotational direction of motor 19 is again reversed; because engagement of the pawl 32 prevents further movement of the trolley, there is an automatic drop in the speed of the motor, so that the trolley 15 moves from right to left to engage with and separate the next plate 1 in the press. The switchover process is repeated until each of the plates 1 are removed from the compressed area of the filter press in the same manner as previously described. On each switchover, of the rotational direction, the filter plate 1 is advanced by the pawl 32 which also acts as the limit stop for the trolley. On striking the preceding filter plate, the rotational direction is again reversed and the process repeated. Prior to the reversal of the rotational direction so as to move from right to left, the stopcatch 33 is raised by the driving web 10 of the preceding filter plate so as not to impede movement of the trolleys 15. As soon as it passes the removed filter plates, the stopcatch 13 falls into its proper position for engaging the web 10 of the not removed filterplate.

After the final filter plate has been removed, the trolley moves finally from right to left not knowing that there are no longer any plates for removal. The trolley moves in this direction until it reaches a stop member 46 mounted to depend from the rail 11. The stop member 46 engages the end of the slide 28 which displaces the slide in the direction opposite to the movement of the trolleys 15, i.e., left to right. As a result of this movement, the pawl 32 is raised by the cam 39 and simultaneously, the actuating bar 37 compresses the spring loaded pin 38 into its detent securing the rack 35 in its upward position. On reaching the stop pin 46, the trolley 15 is arrested and the motor reverses itself and returns the trolley to the initial right hand position, to the extreme right of all of the displaced filter plates; this being made possible, since pawl 32 has been raised so that it too will ride over all of the webs 10 of the displaced filter plates. In the extreme right hand position, the slide 28 abuts against a second stop member 47 causing the slide 28 to again shift in the direction opposite movement of the trolley, i.e., from right to left. This releases the pawl 32 so that it falls and at the same time releases the catch 38 so that the rack 35 is now released as well. At the same time, the motor 19 is switched off by a limit switch or microswitch, now shown in the drawings but which may be mounted in association with the stop member 47 to affect final control of the motor 19.

The eventual return of the filter plates into their compressed condition is brought about conventionally, by moving all of the plates simultaneously into the compressed condition by operating upon the movable head or end plate itself. It will be seen from the foregoing that the filter plates may be opened and displaced in a simple and effective manner after performing a filtering operation.

The displacement device has no complex means for holding the second filter plate while moving the first of the compressed filter plates, but nevertheless, said plate is reliably held back during separation by the separating wedge 36. A tilted position, which may occur from the holding back of the first plate to the second plate, is prevented by this displaced device, since before movement of the first filter plate, the separating wedge 36 effectively separates the two. The displacement movement of the trolleys 15 and the separating movement by the rack 25 takes place by means of the same drive chain. Thus, a particularly simple construction is effected.

Various modifications, changes and embodiments have been disclosed, and others will be obvious to those skilled in this art. Accordingly, the present disclosure is to be taken as illustrative only and not limiting of the invention.

What is claimed is:

1. In a filter press defining a length having a plurality of plates arranged along said length of said filter press to be compressed in an operating position from front to rear and to be sequentially separated from said operating position, apparatus for separating and displacing said plates comprising, a rail mounted above and extending along said length of said press, a trolley supported on said rail for movement in a direction reciprocably along said rail; an endless chain operably connected to said trolley for moving said trolley, a reversible motor operably connected to said chain for driving said chain, a sprocket wheel fixed on a shaft journalled in said trolley entrained with said chain, separating means comprising an elongated rack supported in said trolley for movement reciprocably between an upper position and a lower position in a direction perpendicular to said direction of movement of said trolley toward and away from said plates, a pinion mounted on said shaft and meshing with said rack, and spring means for biasing said rack in said upper position away from said plates, said spring means also exerting on said sprocket wheel a frictional force preventing rotation of said sprocket wheel while said chain is moving said trolley, pawl means pivotally depending from said trolley and catch means pivotally depending from said trolley in opposition to said pawl means, said catch means for providing that when said trolley is moved in one direction said trolley is stopped at the front-most of said plates and when said trolley is moved in the opposite direction, said pawl means engages said front-most plate permitting further movement of said trolley to displace said front-most plate, said endless chain being thereby operable to sequentially move said trolley to place said separating means in a position between said front-most and next adjacent of said plates and on arresting said trolley in this position to thereafter cause said rack of said separating means to descend to separate said front-most from said next adjacent plate, ascend from between said front-most and said next adjacent plate and permit said front-most plate to be displaced.

2. The apparatus according to claim 1 including a slide mounted on said trolley for reciprocal movement relative to said trolley in a direction parallel to said direction of movement of said trolley, a stop means located at each end of said rail for engaging said slide and for causing said slide to move on movement of said trolley, said slide including cam means for raising said pawl out of engagement with said plates on movement of said trolley to one end of said rail.

3. The apparatus according to claim 2, including means for connecting said separating means and said sprocket wheel shaft comprising a pin engageable with said rack to block movement of said rack and said slide includes a stop member engageable with said trolley at said one end of said rail to actuate said pin to block said rack.

4. The filter press having said apparatus for separating and displacing said plates according to claim 1, 2 or 3 located on each side of said press and actuated for simultaneous conjoint movement.

5. The press according to claim 4 including a common drive motor for each of said endless chains.

6. The press according to claim 5 including means for automatically reversing each said common drive motor in response to stoppage of movement of said trolley.

* * * * *